(12) United States Patent
Rivers

(10) Patent No.: US 10,997,563 B1
(45) Date of Patent: May 4, 2021

(54) SYSTEMS, DEVICES, AND/OR METHODS FOR MANAGING CALENDARS

(71) Applicant: Isaiah Rivers, Summerville, SC (US)

(72) Inventor: Isaiah Rivers, Summerville, SC (US)

( * ) Notice: Subject to any disclaimer, the term of this patent is extended or adjusted under 35 U.S.C. 154(b) by 0 days.

(21) Appl. No.: 16/541,713

(22) Filed: Aug. 15, 2019

Related U.S. Application Data

(60) Provisional application No. 62/845,612, filed on May 9, 2019.

(51) Int. Cl.
  *G06F 3/048* (2013.01)
  *G06Q 10/10* (2012.01)
  *G06F 3/0482* (2013.01)

(52) U.S. Cl.
  CPC ......... *G06Q 10/109* (2013.01); *G06F 3/0482* (2013.01)

(58) Field of Classification Search
  CPC .................................................. G06F 3/0482
  See application file for complete search history.

(56) References Cited

U.S. PATENT DOCUMENTS

| | | | | |
|---|---|---|---|---|
| 7,349,920 B1* | 3/2008 | Feinberg | ............... | G06Q 10/109 |
| 8,150,962 B1* | 4/2012 | Wolter | .................... | G06F 9/451 |
| | | | | 709/224 |
| 2009/0054103 A1* | 2/2009 | Stavenow | ........... | H04L 65/1096 |
| | | | | 455/556.2 |
| 2011/0128825 A1* | 6/2011 | Tanaka | .................. | G06T 1/0007 |
| | | | | 368/29 |
| 2014/0074535 A1* | 3/2014 | Woo-Kwan-Chung | ...................... | G06Q 10/1095 |
| | | | | 705/7.19 |
| 2014/0244795 A1* | 8/2014 | Hoffmann | ............... | G06F 40/20 |
| | | | | 709/219 |
| 2016/0188646 A1* | 6/2016 | Zandani | ................ | G06F 16/353 |
| | | | | 707/693 |
| 2017/0024703 A1* | 1/2017 | Philipp | .............. | G06Q 10/1093 |
| 2017/0124525 A1* | 5/2017 | Johnson | ............. | G06Q 10/1095 |
| 2018/0089241 A1* | 3/2018 | Mendels | ................. | G06F 16/93 |
| 2018/0197066 A1* | 7/2018 | Osotio | .................... | G06N 3/006 |
| 2019/0108097 A1* | 4/2019 | Zhuang | ................... | H04L 63/08 |

* cited by examiner

*Primary Examiner* — David E Choi

(74) *Attorney, Agent, or Firm* — Dale Jensen, PLC; Dale Jensen

(57) ABSTRACT

Certain exemplary embodiments can provide a method comprising causing a rendering of a first user interface. The first user interface comprising a calendar election menu. The calendar election menu can comprise a list of calendar options comprising religion, and country. The first user interface is constructed to receive a user selection of one or more of the calendar options.

3 Claims, 3 Drawing Sheets

SYSTEMS, DEVICES, AND/OR METHODS FOR MANAGING CALENDARS

CROSS-REFERENCES TO RELATED APPLICATIONS

This application claims priority to, and incorporates by reference herein in its entirety, U.S. Provisional Patent Application Ser. No. 62/845,612, filed May 9, 2019.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a method comprising causing a rendering of a first user interface. The first user interface comprising a calendar election menu. The calendar election menu can comprise a list of calendar options comprising religion, and country. The first user interface is constructed to receive a user selection of one or more of the calendar options.

Certain exemplary embodiments provide a configurable calendar that renders holidays responsive to a user selection of religion, language, country, continent, ethnicity, and/or military status, etc.

Figure 1:
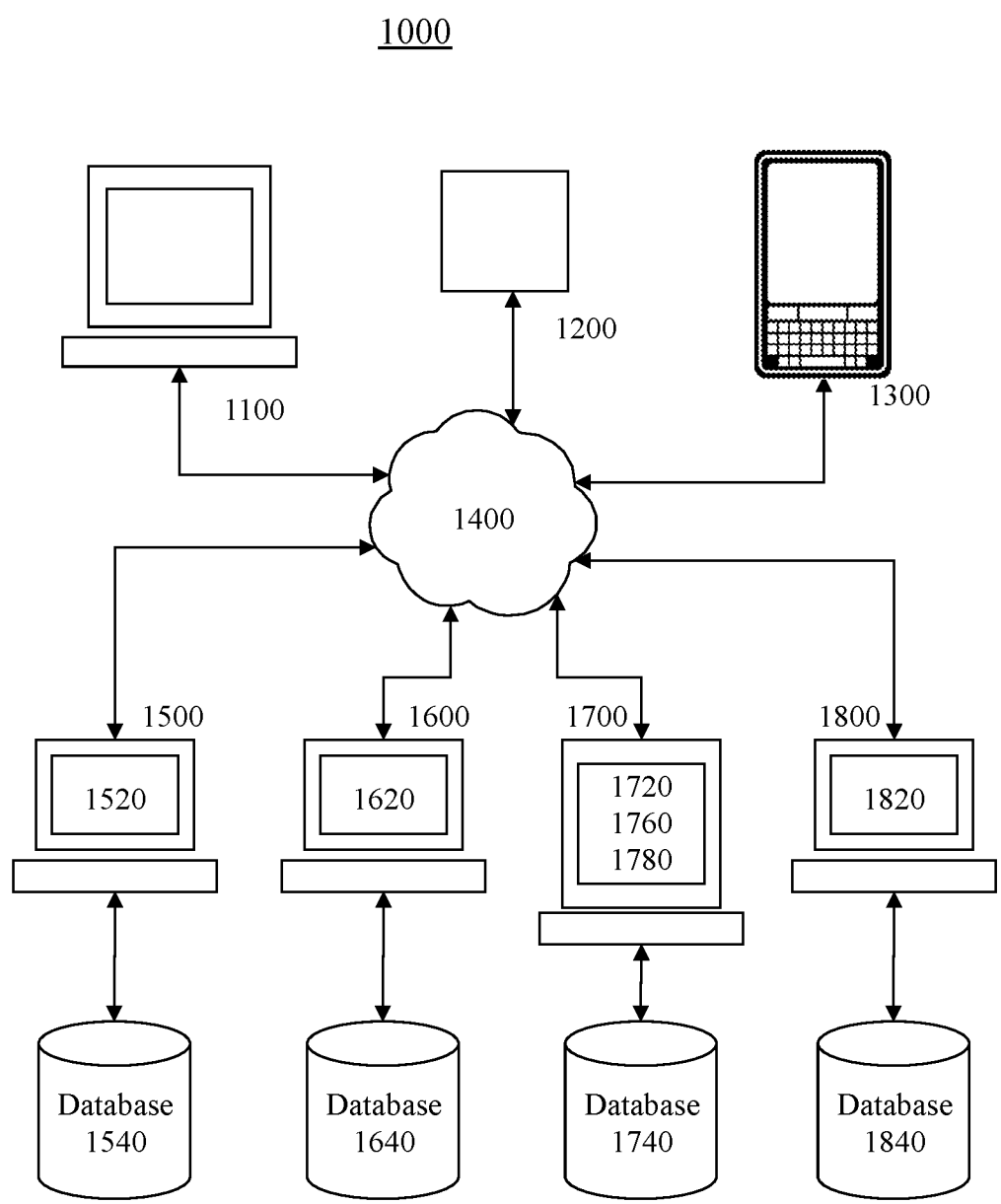
FIG. 1 is a block diagram of an exemplary embodiment of a system 1000.

FIG. 1 is a block diagram of an exemplary embodiment of a system 1000, which can comprise a smartphone 1300, an information device 1100, tablet 1200, a network 1400, a first server 1500, a second server 1600, a third server 1700, and a fourth server 1800. First server 1500 can comprise a first user interface 1520 and can be coupled to a first database 1540. Second server 1600 can comprise a second user interface 1620 and can be coupled to a second database 1640. Third server 1700 can comprise a third user interface 1720, a processor 1760, machine instructions 1780, and can be coupled to a third database 1740. Fourth server 1800 can comprise a fourth user interface 1820 and can be coupled to a fourth database 1840. Any of the methods and/or steps thereof can be carried out in whole or in part by tablet 1200, smartphone 1300, information device 1100 and/or first server 1500. Second server 1600, third server 1700, and/or fourth server 1800 can each be associated with implementation of a system via which customizable holiday calendars are provided to customers. In certain exemplary embodiments, system 1000 can be used to implement one or more methods disclosed herein.

Figure 2:
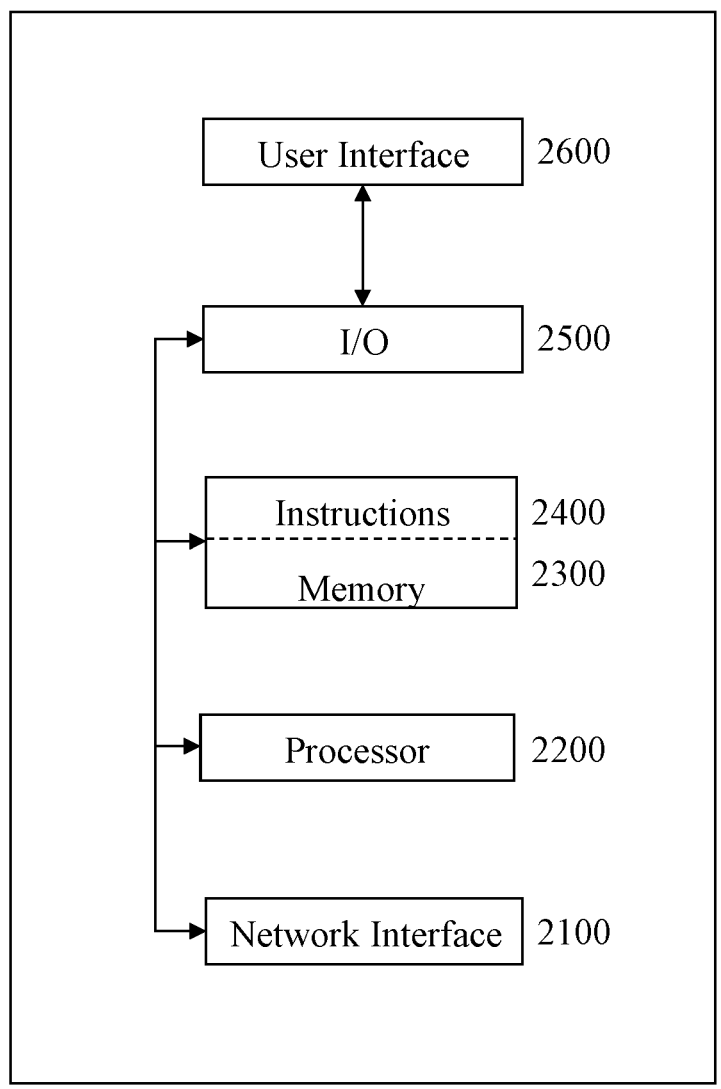
FIG. 2 is a block diagram of an exemplary embodiment of an information device 2000.

FIG. 2 is a block diagram of an exemplary embodiment of an information device 2000, which in certain operative embodiments can comprise, for example, first server 1500 and/or information device 1100, of FIG. 1. Information device 4000 can comprise any of numerous circuits and/or components, such as for example, one or more network interfaces 2100, one or more processors 2200, one or more memories 2300 containing instructions 2400, one or more input/output (I/O) devices 2500, and/or one or more user interfaces 2600 coupled to one or more I/O devices 2500, etc.

In certain exemplary embodiments, via one or more user interfaces 2600, such as a graphical user interface, a user can view a rendering of information related to customizable holiday calendars.

Figure 3:
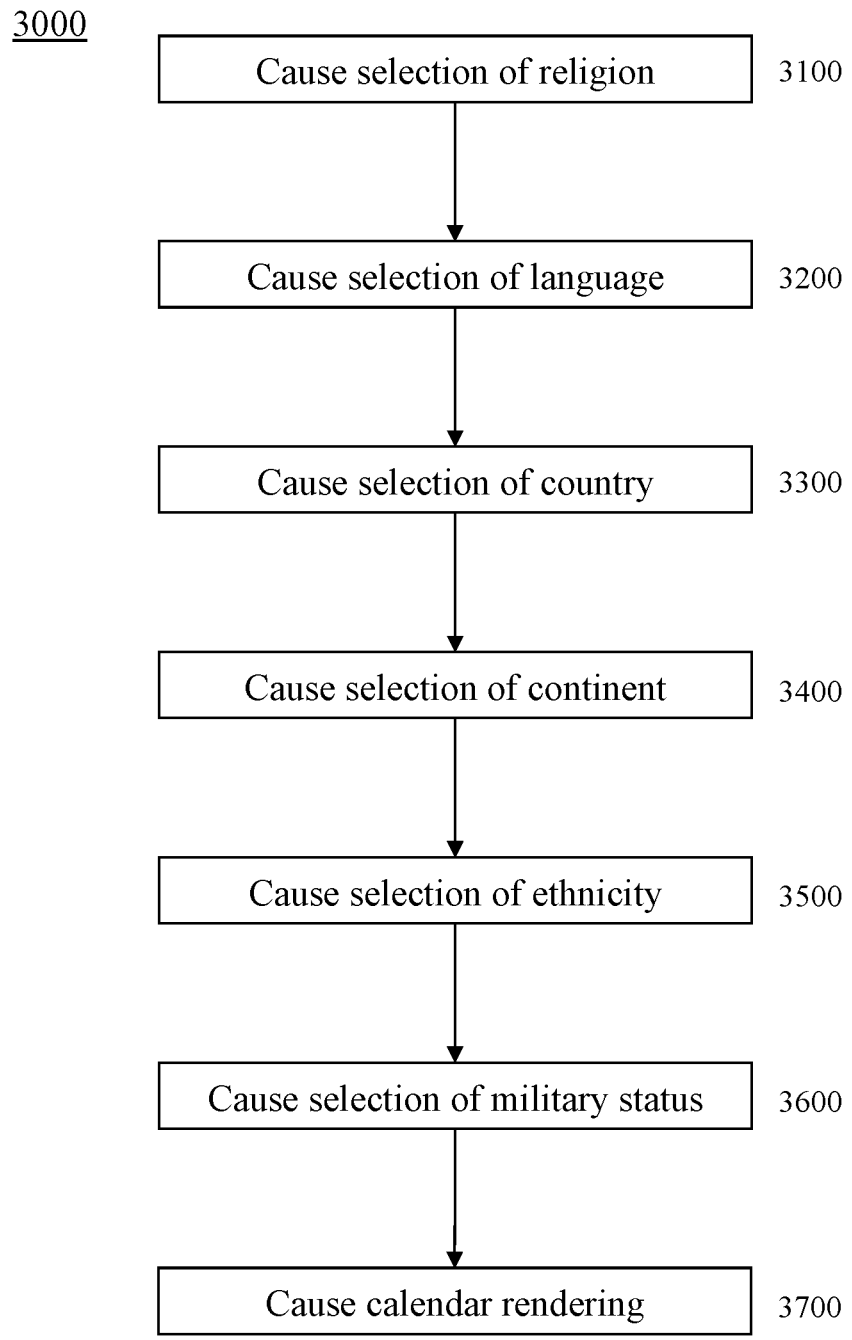
FIG. 3 is a flowchart of an exemplary embodiment of a method 3000.

FIG. 3 is a flowchart of an exemplary embodiment of a method 3000. At activity 3100, certain exemplary embodiment can cause selection of a religion. At activity 3200, certain exemplary embodiment can cause selection of a language. At activity 3300, certain exemplary embodiment can cause selection of a country. At activity 3400, certain exemplary embodiment can cause selection of a continent. At activity 3500, certain exemplary embodiment can cause selection of ethnicity. At activity 3600, certain exemplary embodiment can cause selection of military status. Certain exemplary embodiments cause a rendering of a first user interface. The first user interface comprises a calendar election menu. The calendar election menu comprises a list of calendar options comprising one or more of religion, language, country, continent, ethnicity, and/or military status, etc. The first user interface is constructed to receive a user selection of one or more of the calendar options.

At activity 3700, certain exemplary embodiment can cause a calendar to be rendered. Responsive to receipt of the user selection of one or more of the calendar options, certain exemplary embodiment can cause a rendering of a second user interface, the second user interface comprising a rendered calendar with holidays reflective of the user selection of the one or more of the calendar options.

Certain exemplary embodiments cause a rendering of a user interface to a user. The user interface can comprise a set of pull down menus and/or hyperlinks that allow a user to provide criteria for customizing a holiday calendar. The set of pull down menus and/or hyperlinks can provide a user with options to select from a predetermined set of one or more years, religions, languages, countries, continents, ethnicities, and/or military statuses. A set of user selections causes a calendar of holidays to be rendered based upon the user-selected selected criteria.

For example, the predetermined set of religions can comprise Buddhism, Judaism, Christianity, Hinduism, Islam, Shintoism, Confucianism, Sikhism, and/or Baha'i, etc. The predetermined languages can comprise English, Spanish, Portuguese, French, Swahili, Finnish, Dutch, Chinese, Korean, Cyrillic, and/or German, etc. The predetermined countries can comprise the United States, Canada, Mexico, Honduras, Brazil, Chile, Peru, England, France, Spain, Germany, Italy, Morocco, Egypt, Israel, Syria, Turkey, Greece, Russia, Mongolia, China, India, Viet Nam, Cambodia, and/or Japan, etc. Continents can comprise North America, South America, Europe, Africa, Asia, and/or Australia, etc. Ethnicities can comprise Caucasian, African, Asian, and/or Aboriginal, etc. Military statuses can comprise active or inactive. In addition, military statuses can also comprise a branch of a country's military (e.g., army, navy, national guard, and/or air force, etc.).

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof adapted to—made suitable or fit for a specific use or situation.

and/or—either in conjunction with or in alternative to.

apparatus—an appliance or device for a particular purpose associate—to join, connect together, and/or relate.

automatically—acting or operating in a manner essentially independent of external influence or control. For example, an automatic light switch can turn on upon "seeing" a person in its view, without the person manually operating the light switch.

calendar—a chart of all dates of a predetermined time period (e.g., a time period of a month and/or year, etc.).

calendar election menu—a list of options that direct holiday dates rendered on a chart of all dates of a predetermined time period (e.g., a time period of a month and/or year, etc.).

calendar options—choices concerning holidays to be rendered on a calendar.

can—is capable of, in at least some embodiments.

cause—something that produces an effect, result, or condition.

comprising—including but not limited to.

configure—to make suitable or fit for a specific use or situation.

constructed to—made to and/or designed to.

continent—any of the world's main continuous expanses of land (such as, Africa, Antarctica, Asia, Australia, Europe, North America, South America).

convert—to transform, adapt, and/or change.

country—a nation or geographically distinct area.

data—distinct pieces of information, usually formatted in a special or predetermined way and/or organized to express concepts.

define—to establish the outline, form, or structure of determine—to obtain, calculate, decide, deduce, and/or ascertain.

device—a machine, manufacture, and/or collection thereof.

ethnicity—an affiliation based upon cultural characteristics.

generate—to create, produce, give rise to, and/or bring into existence.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

holiday—a holy day for a particular religion or creed and/or a legal day off in a particular country or legal system.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

language—a system of communication used by a particular country or community.

list—an ordered set of information.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

military status—a classification of affiliation with an armed forces organization.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish, supply, give, and/or make available.

receive—to get as a signal, take, acquire, and/or obtain.

reflective of—based upon.

religion—an organization having a system of beliefs and/or values.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

select—to choose from a plurality of alternatives.

set—a related plurality.

store—to place, hold, and/or retain data, typically in a memory.

substantially—to a great extent or degree.

system—a collection of mechanisms, devices, machines, articles of manufacture, processes, data, and/or instructions, the collection designed to perform one or more specific functions.

transmit—to send as a signal, provide, furnish, and/or supply.

user—a person interfacing with an information device.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A method comprising:
    causing a rendering of a first user interface, the first user interface comprising a calendar election menu, the calendar election menu comprising a list of calendar options comprising religion, language, country, continent, ethnicity, and military status, the first user interface constructed to receive a user selection of one or more of the calendar options; and
    responsive to receipt of the user selection of one or more of the calendar options, causing a rendering of a second user interface, the second user interface comprising a rendered calendar with holidays reflective of the user selection of the one or more of the calendar options.

2. A method comprising:
    causing a rendering of a first user interface, the first user interface comprising a calendar election menu, the calendar election menu comprising a list of calendar options comprising religion, country, and military status, the first user interface constructed to receive a user selection of one or more of the calendar options; and
    responsive to receipt of the user selection of one or more of the calendar options, causing a rendering of a second user interface, the second user interface comprising a rendered calendar with holidays reflective of the user selection of the one or more of the calendar options.

3. A machine-readable medium comprising machine-implementable instructions for activities comprising:
    causing a rendering of a first user interface, the first user interface comprising a calendar election menu, the calendar election menu comprising a list of calendar options comprising religion, and country, the first user interface constructed to receive a user selection of one or more of the calendar options; and
    responsive to receipt of the user selection of one or more of the calendar options, causing a rendering of a second user interface, the second user interface comprising a rendered calendar with holidays reflective of the user selection of the one or more of the calendar options.

* * * * *